United States Patent [19]
Fujii et al.

[11] Patent Number: 5,366,685
[45] Date of Patent: Nov. 22, 1994

[54] PROCESS OF MOLDING THERMOPLASTIC SHEET BY PLUG ASSIST VACUUM FORMING

[75] Inventors: Atsushi Fujii, Himeji; Kouzaburo Matsuzawa, Tokyo, both of Japan

[73] Assignee: Idemitsu Petrochemical Co., Ltd., Tokyo, Japan

[21] Appl. No.: 948,072

[22] Filed: Sep. 21, 1992

Related U.S. Application Data

[63] Continuation-in-part of Ser. No. 799,901, Nov. 26, 1991, abandoned, which is a continuation of Ser. No. 530,638, May 30, 1990, abandoned.

[30] Foreign Application Priority Data

Jul. 18, 1989 [JP] Japan ................... 1-185711
Apr. 24, 1990 [JP] Japan ................... 2-109485

[51] Int. Cl.$^5$ .................. B29C 51/10; B29C 51/22
[52] U.S. Cl. .................... 264/547; 264/554; 425/388
[58] Field of Search ............ 264/280, 322, 510, 515, 264/547, 549, 553, 555, 554; 425/388, 504, 505

[56] References Cited

U.S. PATENT DOCUMENTS

| | | | |
|---|---|---|---|
| 2,365,637 | 12/1944 | Helwig | 264/554 |
| 2,902,718 | 9/1959 | Martelli et al. | 264/553 |
| 2,905,969 | 9/1959 | Gilbert et al. | 18/19 |
| 3,027,596 | 4/1962 | Knowles | 264/555 |
| 3,181,202 | 5/1965 | Martelli et al. | 264/553 |
| 3,235,639 | 2/1966 | Knowles | 264/554 |
| 3,314,110 | 4/1967 | Missbach | 425/388 |
| 3,350,484 | 10/1967 | Magill | 264/90 |
| 3,385,025 | 5/1968 | Lemelson | 53/453 |
| 3,557,517 | 1/1971 | Limmer | 53/453 |
| 4,118,454 | 10/1978 | Miki et al. | 264/554 |
| 4,259,286 | 3/1981 | Louis et al. | 264/555 |
| 4,265,070 | 5/1981 | Mainberger et al. | 53/453 |
| 4,375,146 | 3/1983 | Chung | 53/453 |
| 4,384,441 | 5/1983 | Maruyama et al. | 53/553 |
| 4,421,712 | 12/1983 | Winstead | 264/554 |
| 4,494,361 | 1/1985 | Barathon et al. | 53/553 |
| 4,571,924 | 2/1986 | Bahrani | 53/453 |
| 4,656,811 | 4/1987 | Dedolph | 53/559 |
| 4,750,318 | 6/1988 | Matsuzawa | 53/559 |
| 4,909,722 | 3/1990 | Wakayama et al. | 264/322 |

FOREIGN PATENT DOCUMENTS

| | | | |
|---|---|---|---|
| 408874A2 | 1/1991 | European Pat. Off. | |
| 55-111222 | 8/1980 | Japan | 264/555 |
| 56-039266 | 9/1981 | Japan | |
| 58-126117 | 7/1983 | Japan | 425/388 |
| 58-126118 | 7/1983 | Japan | 425/388 |
| 60-007131 | 3/1985 | Japan | |
| 1136613 | 12/1968 | United Kingdom | 264/549 |

OTHER PUBLICATIONS

Philip F. Charles, Vacuum Systems for Thermoforming Plastics World, vol. 21 #4, Apr. 1963 pp. 34–39.

*Primary Examiner*—Catherine Timm
*Attorney, Agent, or Firm*—Flynn, Thiel, Boutell & Tanis

[57] ABSTRACT

A process of molding a thermoplastic sheet for making blister packaging. The process particularly includes premolding steps of brining the sheet into close contact with the outer cylindrical surface of a molding drum, preheating the sheet and concurrently vacuum sucking the sheet into a cavity defined on the outer cylindrical surface of the drum, to partially form a pocket in the sheet, and a full-molding step of vacuum sucking the sheet and concurrently inserting the sheet into the cavity by means of a plug so that the pocket is conformed to the shape of the plug.

15 Claims, 6 Drawing Sheets

PROCESS OF MOLDING THERMOPLASTIC SHEET BY PLUG ASSIST VACUUM FORMING

This application is a continuation-in-part of U.S. Ser. No. 07/799,901, filed Nov. 26, 1991, now abandoned which is a continuation of U.S. Ser. No. 07/530,638, filed May 30, 1990 now abandoned.

This application is related to application Ser. No. 07/406,727, filed Sep. 13, 1989.

BACKGROUND OF THE INVENTION

1. Field of the Invention

The present invention relates to a process of and apparatus for molding a thermoplastic sheet and is applicable, e.g., to a blister package used for packaging foods, daily needs, medicines and the like.

2. Description of the Related Art

Recently, the so-called blister package has been employed, in which a resin sheet is molded to have a pocket adapted to the shape of a content of the package, e.g., a medicine and contained it therein and subsequently seals the pocket.

Heretofore, polyvinylchloride (PVC) has been predominantly employed as a material for the above resin sheet. However, polyvinylchloride contains some problems, for example a harmful gas shall be produced when incinerated. Thus, polypropylene (PP) has been employed as a material free from the above problems and having a good moistureproofness instead of polyvinylchloride. In order to achieve high moistureproofness of the resin sheet, a use of a composite material of polypropylene and, e.g., polyvinylidenechloride (PVDC) or polychlorotrifluoroethylene (PCTFE) has been proposed.

The present applicant proposed a polypropylene molding machine providing properties of the resin sheet better than the properties of moldability, molding speed, sealability, curability and half-cuttability of the resin sheet provided by a conventional polyvinylchloride molding machine (See Japanese patent application SHO. 63-231578, which corresponds to U.S. application Ser. No. 07/406,727, filed Sep. 13, 1989). However, when the resin sheet has a multilayered or laminated structure made of a plurality materials instead of a single-layered structure, the laminated resin sheet must be thermally molded at a low temperature since each material of the laminated resin sheet has a different melting point and softening point. Therefore, a conventional high-temperature vacuum molding machine and process for a single-layered resin sheet has failed to attain satisfactory properties such as moldability to a laminated resin sheet.

A prior-art hot plate heating and plug assist compressed air molding machine has been provided as a molding machine which can also mold a laminated resin sheet. This prior-art molding machine can mold a PVC single-layered sheet and PVC/PCD laminated sheet, however, provides poor high-speed moldabilities thereto and a poor moldability to PP. In addition, this prior-art molding machine entails a problem in that it fails to provide a good moldability to a thin resin sheet other than the above problems. In addition, indirect heating and drum vacuum molding machines (See Japanese examined utility model application publications SHO. 60-7131 and SHO. 56-39266, Japanese unexamined patent application publications SHO. 58-126117 and SHO. 58-1261 and the above-referenced Japanese patent application SHO. 63-231578) can mold the PP single-layered sheet and PCV/PVDC laminated sheet but difficultly mold laminated sheets such as a PP/PCTFE/PP laminated sheet and PVC/PCTFE/PP laminated sheet.

An object of the present invention is to provide a process of molding a thermoplastic sheet having a fine molding performance regardless of a sheet structure and material.

SUMMARY OF THE INVENTION

A process of molding a thermoplastic sheet according to the present invention, the process having the step of feeding the thermoplastic sheet to a molding drum in order to thermally mold a pocket on the thermoplastic sheet, is characterized in that the process comprises the steps of: bringing a thermoplastic sheet into close contact with the outer cylindrical surface of a molding drum, the molding drum having plural cavities whose each edge surface has a heat insulation layer, externally heating the thermoplastic sheet and concurrently vacuum sucking the thermoplastic sheet through the cavities of the molding drum; and a full-molding step which includes vacuum sucking through the cavities of the molding drum the thermoplastic sheet with the pocket premolded therein into the cavity and concurrently full-molding the pocket by means of a plug. A failure of essentially the same vacuum suction through the cavity in the full-molding step as that in the premolding step provides a poor mold-releasability of the sheet from the plug which results in poor molding conditions.

The full-molding step of the present molding process may also be adapted for another step in which the molding drum is continuously rotated and a rotatable roll plug is inserted into the cavity provided on the surface of the molding drum in order to full-mold the pocket on the thermoplastic sheet in the cavity.

In accordance with the process for thermally molding the thermoplastic sheet by means of the roll plug, a molding speed is preferably 10 m/min or less and an optimum temperature of the roll plug is 40 degrees Celsius to 130 degrees Celsius. The top surface of the roll plug is preferably slightly tapered toward its rotational direction of the roll plug.

In the full-molding step, the molding drum may be intermittently rotated and while the molding drum stays, a linearly reciprocating plug may be inserted into the cavity of the molding drum so that the thermoplastic sheet is full-molded. In this embodiment, an optimum temperature of the reciprocating plug is 20 degrees Celsius to 50 degrees Celsius.

The linearly reciprocating plug is preferably so controlled that a speed of the plug entering the cavity is 5 cm/sec or more, a stay time at bottom dead center of the plug, namely, the location of the deepest penetration of the plug into the mold cavity, is 0.2 second or more.

The thermoplastic sheet is preferably fed into the molding drum under a tension of 0.2 kg/cm to 2.4 kg/cm and sucked thereonto by a vacuum suction through a suction through-hole defined on the molding drum so as to be in close contact with the outer cylindrical surface of the molding drum. The above tension may be produced by an arrangement comprising a brake roller or dancer roller.

The temperature of the molding drum preferably maintains 30 degrees Celsius to 80 degrees Celsius.

In accordance with the present molding process, the vacuum degree through the premolding step is preferably more than 400 mm Hg and that of the full-molding step is preferably more than 600 mm Hg.

The clearance between the roll plug or linearly reciprocating plug and the cavity in the longitudinal direction is settled from (the thickness of the thermoplastic sheet) to (the total of the thickness of the thermoplastic sheet plus 250 μm), preferably at (the total of the thickness of the thermoplastic sheet plus 150 μm), when the roll plug stays at its bottom dead center.

The present invention is applicable to a thermoplastic sheet comprising at least a layer of polypropylene. This thermoplastic sheet may also comprise a relatively thin sheet in the form of film.

DESCRIPTION OF THE PREFERRED EMBODIMENTS

The preferred embodiments of the processes for molding a thermoplastic sheet in the present invention and a used blister packager will be described together with reference to the drawings hereinafter.

Embodiment 1

Figure 1:
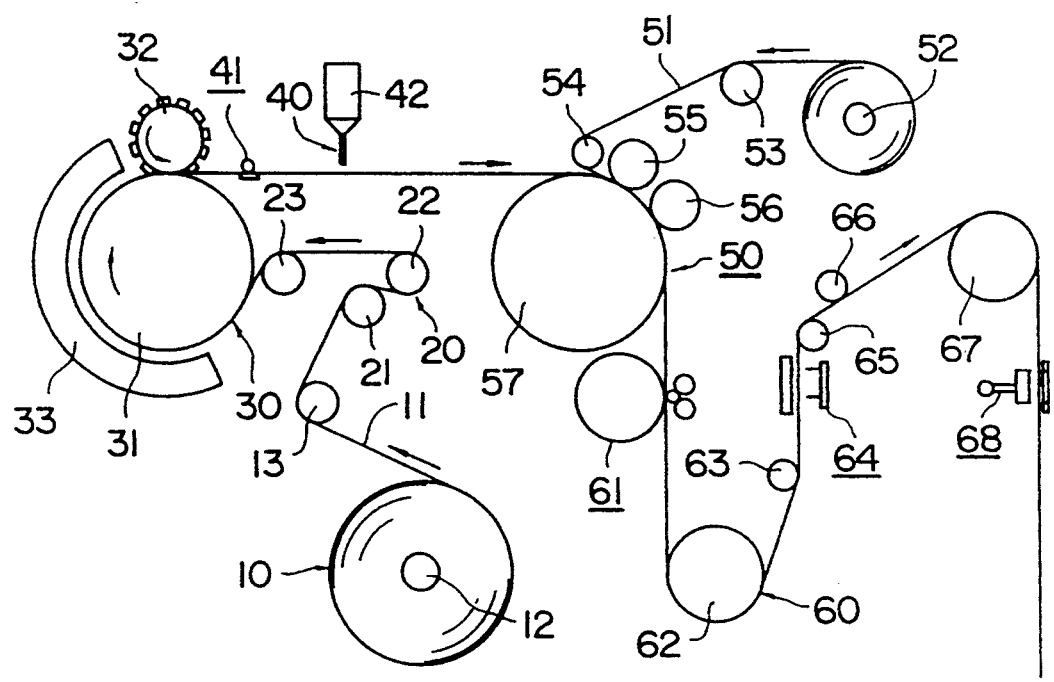
FIG. 1 is a schematic diagram of a blister molding machine used in a first Embodiment of the present invention.

As shown in FIG. 1, a blister packager used in Embodiment 1 comprises a molded sheet feeder 10, a tensioner 20, a pocket former 30, a content charger 40, a sealer 50 and a trimmer 60 arranged in this order.

The molded sheet feeder 10 comprises a sheet feed roller 12 onto which a thermoplastic sheet 11 is wound and a guide roller 13.

The tensioner 20 comprises a first guide roller 21, a brake roller 22 and a second guide roller 23. The first guide roller 21 is positioned on the side of the guide roller 23 so that the thermoplastic sheet 11 is wound on to the outer cylindrical surface to the brake roller 22 in order to provide a greater contact area between the thermoplastic sheet 11 and the brake roller 22. The brake roller 22 may comprise, e.g., a roller with a power brake. The brake roller 22 applies a tension to a part of thermoplastic sheet 11 in a pulled position caused by the rotating molding drum 31.

Figure 2:
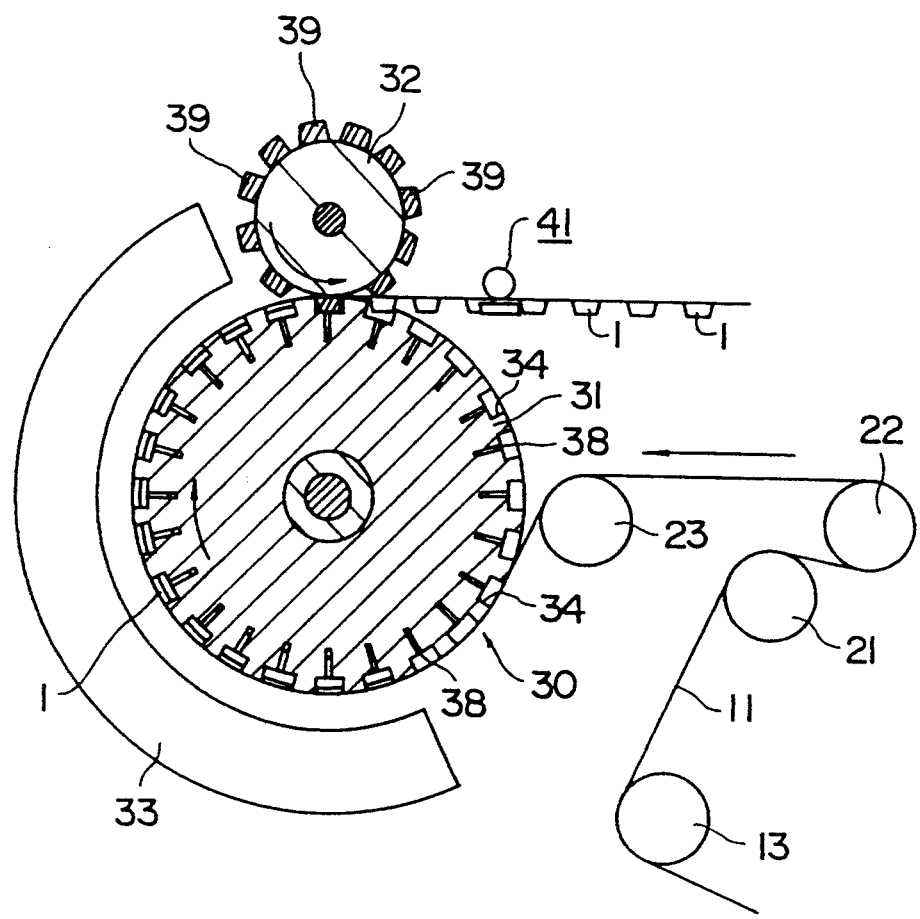
FIG. 2 is a front view of the main part of the blister molding machine of FIG. 1.

As best shown in FIG. 2, the pocket former 30 comprises a rotatable molding drum 31, a rotatable roll plug 32 disposed upper side of this molding drum 31 so that the outer cylindrical surface of the roll plug 32 and molding drum 31 are in contact with each other, and a semicircular cylindrical infrared heater 33 opposite to and covering essentially a half area of the outer cylindrical surface of the molding drum 31.

Figure 3:
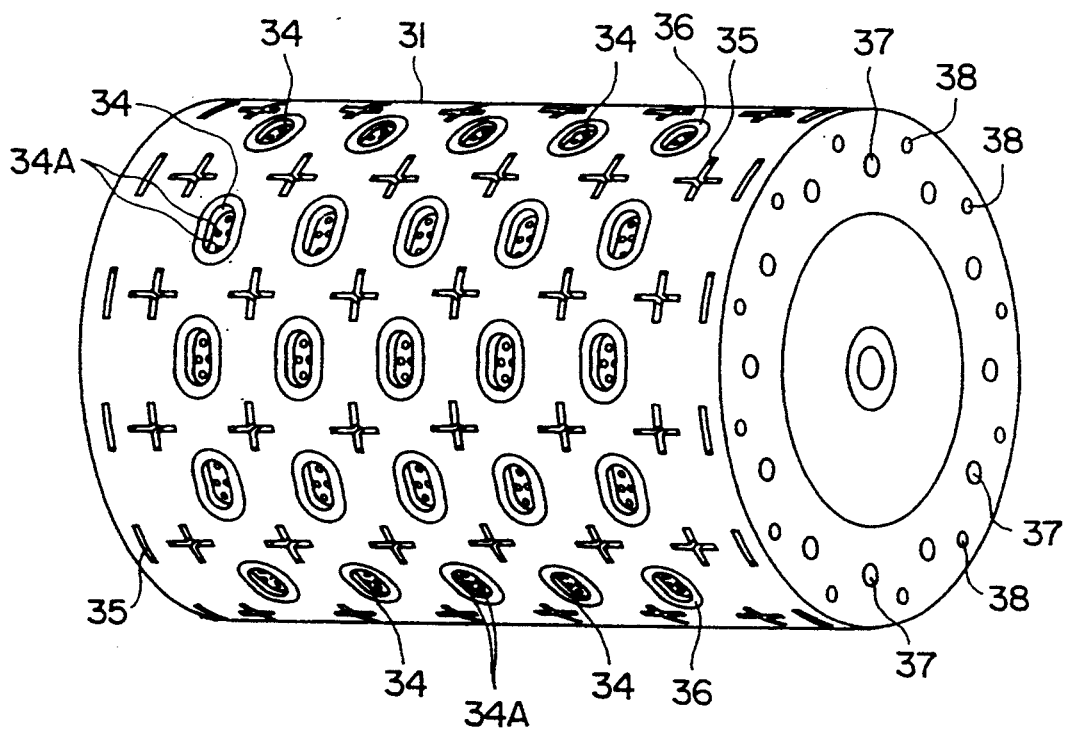
FIG. 3 is a perspective view of a molding drum.
Figure 4:
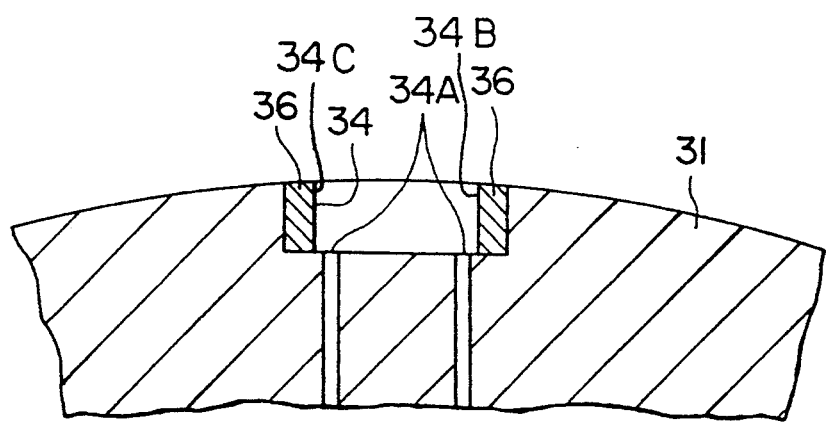
FIG. 4 is a fragmentary section through a cavity defining portion of the molding drum of FIG. 3.

As shown in FIGS. 2 and 3, the outer cylindrical surface of the molding drum 31 defines therein a plurality of cavities 34 for forming pockets 1 and spaced at predetermined pitches and a plurality of suction holes 35 through which the thermoplastic sheet 11 is vacuum sucked to the outer cylindrical surface of the molding drum 31 and which are spaced at predetermined pitches. As best shown in the FIG. 4 section, each of the cavities 34 contains a heat insulation layer 36 made, e.g., of polyamide and fitting the overall side edge surface 34B of the cavity 34. The wall thickness of the heat insulation layer 36 is, e.g., 1 mm. Each cavity 34 is selected to have dimensions corresponding to those of the pocket 1 containing, e.g., a third-sized medicine capsule therein. Each suction hole 35 is positioned in a portion of the outer cylindrical surface of the molding drum 31 which does not have the cavity 34. The suction holes 35 is formed into the plus-shape and the minus-shape. The interior of the molding drum 31 has a plurality of vacuum communication holes 37 communicating with a plurality of small holes 34A defined at the bottom of each cavity 34 and has a plurality of vacuum communication holes 38 communicating with a plurality of the suction holes 35. The vacuum communication holes 37 and 38 are communicating with a vacuum producing means (not shown). The cavities 34 aligned in a direction perpendicular to the rotational direction of the molding drum 31 (in a direction parallel to the axle of the molding drum 31), are controllable in respect of the degree of the vacuum. In the full-molding step, thus aligned cavities 34 into which plugs 39 of a roll plug 32 are inserted are vacuum sucked at the vacuum degree equal to or greater than those of other cavities 34. The maximum magnitude of the vacuum sucked in each cavity is insufficient to pull the thermoplastic sheet out of engagement with the plug. As a result, the thermoplastic sheet will conform to the shape of the plug and not to the shape of the cavity.

Figure 5:
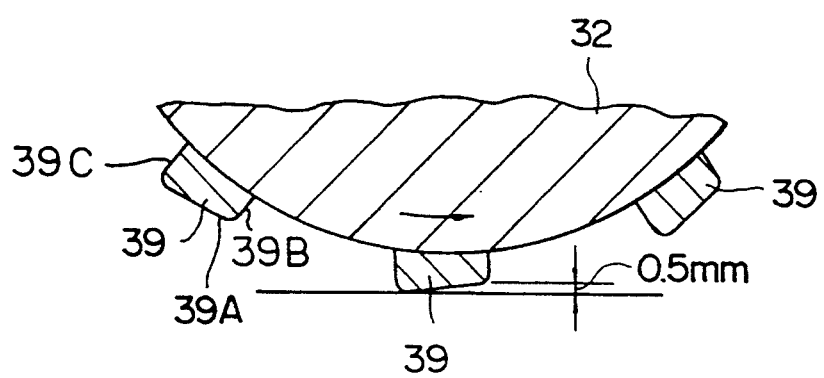
FIG. 5 is a main fragmentary section through a plug.

As shown in FIG. 2, the roll plug 32 has a cylindrical shape on which has a plurality of plugs 39 each having a shape corresponding to that of each cavity 34 in the molding drum 31, the plugs 39 being arranged axially of and in the rotational direction of the roll plug 32 at the same pitches as those of the cavities 34 of the molding drum 31. As shown in FIG. 5, the top surface 39A of each of the plugs 39 is slightly tapered toward the rotational direction of the roll plug 32. For example, the height of the leading edge 39B of each plug 39 for third-sized capsule from the outer cylindrical surface of the roll plug 32 is slightly, e.g., 0.5 mm lower than that of the trailing edge 39C of the plug 39 for third-sized capsule. The bottom wall of the pocket formed in the thermoplastic sheet will end up being of a shape different than the end of the plug 39. since the molding temperature is rather low (see examples below), the thermoplastic sheet will elastically recover so that the desired cavity bottom wall configuration will be achieved. The above-described shape of the plug 39 can be provided with a flat top surface of a molded pocket 1. The plug 39 comprises a plug body of Al the surface of which is coated with Teflon (registered trademark), a kind of fluorocarbon resin. Alternatively, the plug 39 may comprise a single plug body of Al. The roll plug 32 has an inner heater (not shown) therein. The outer diameter of the roll plug 32 is optional.

As shown in FIG. 1, the content charger 40 comprises a half-slitter 41 cutting perforations into the stream direction of the thermoplastic sheet 11, a content feeder 42 feeding a content, e.g., a medicine capsule into the pocket 1.

The sealer 50 comprises a seal feed roller 52 on which a roll of mount 51, e.g., Al foil is wound, two guide rollers 53 and 54, two sealing rollers 55 and 56 heat sealing the pockets 1 in the thermoplastic sheet 11, and a seal receiving roller 57.

The trimmer 60 comprises a curl eliminator 61, two guide rollers 62 and 63, a transverse half-slitter 64 cutting perforations into and transversely of the thermoplastic sheet 11, three guide rollers 65, 66 and 67, and a punching machine 68 punching in the form of blister package the thermoplastic sheet 11 to which the mount 51 has been heat sealed.

When the plug 39 is inserted as deep as it can go into corresponding cavity 34 as shown in FIG. 2, namely, at the location of the bottom dead center of the plug, and just before being withdrawn therefrom, a clearance is provided between the leading edge 39B (FIG. 5) of the plug 39 and the corresponding leading edge surface 34B of the cavity 34. A further clearance is provided between the trailing edge 39C of the plug 39 and the corresponding trailing edge surface 34C of the cavity 34, which clearances are in the range of the thickness of the thermoplastic sheet to the thickness of the thermoplastic sheet 11 plus 250 $\mu$m, preferably a thickness of the thermoplastic sheet 11 plus 150 $\mu$m. A clearance C exceeding this total increases an inclination of the side wall of the pocket 1 and thereby the pocket 1 fails to well reproduce the shape of the plug 32.

Hereinafter, the blister packaging process including a subprocess of molding the pocket 1 of the thermoplastic sheet 11 by means of the blister packager of the above-described arrangement.

As shown in FIG. 1, the sheet feed roller 12 of the molded sheet feeder 10 feeds the thermoplastic sheet 11 which is delivered to the brake roller 22 of the tensioner 20 through the guide rollers 13 and 21 and further to the molding drum 31 through the guide roller 23. During this traveling of the thermoplastic sheet 11, the brake roller 22 applies a braking force to the thermoplastic sheet 11 opposite to a pull of the rotating molding drum 31 to produce a predetermined tension in the thermoplastic sheet 11. The tension is preferably within 0.2 kg/cm to 2.4 kg/cm. Thus, when the thermoplastic sheet 11 has, e.g., a 215-mm width, the thermoplastic sheet 11 will receive an about 5 kg/215 mm to 50 kg/215 mm tension. The tensions which are smaller than 0.2 kg/cm and on the other hand, greater than 2.4 kg/cm cause crinkles in areas of the thermoplastic sheet 11 between adjacent PTP moldings and between adjacent pockets 11.

As shown in FIG. 2, the pocket former 30 premolds the pockets 11 in the thermoplastic sheet 11 which has been fed to the molding drum 31. The infrared heater 33 heats the molding drum 31 of the pocket former 30 at 30 degrees Celsius to 80 degrees Celsius, preferably, 50 degrees Celsius to 60 degrees Celsius. Even when the heating temperature of the infrared heater 33 is below 30 degrees Celsius or above 80 degrees Celsius, a shrinking in a molding unpreferably increases. The thermoplastic sheet 11 under the tension is vacuum sucked through the suction holes 35 defined in the molding drum 31 to be in close contact with the outer cylindrical surface of the molding drum 31 so that corresponding portions of the thermoplastic sheet 11 in contact with the cavities 34 are vacuum sucked into the cavities 34 through the vacuum communication holes 37. The vacuum of the cavities 34 in the premolding position is preferably no less than 400 mm Hg up to 760 mm Hg.

Herein, the vacuum is defined as a value representing a degree of rarefaction below normal atmospheric pressure. Vacuum sucking the thermoplastic sheet 11 through only the cavities 34 but not the suction holes 35 undesirably increases the occurrence of crinkle between adjacent pockets and adjacent PTP moldings. The pocket blank 1 produced in the premolding step is not a full molding exactly fitting the cavity 34 but a premolding with a 50% or less depth of the full molding. Appropriate adjustments of the temperature of the infrared heater 33, the molding speed and the vacuum can control the molding degree of the pocket blank 1.

Then, as shown in FIG. 2, the molding drum 31 rotates to move the thermoplastic sheet 11 which includes the molded pocket blanks 1 to the roll plug 32 full-molding the pockets 1. At this time, the heater (not shown) contained in the roll plug 32 has heated the roll plug 32 at a predetermined temperature. The heating temperature of the roll plug 32 is preferably 40 degrees Celsius to 130 degrees Celsius. When it is below 40 degrees Celsius or above 130 degrees Celsius, the shape of a molding is defective and the mold-releasability of a molding is defective. The thermoplastic sheet 11 has been vacuum sucked to the molding drum 31 under a vacuum of no less than 600 mm Hg immediately before an axial row of plugs 39 is inserted into an axial row of pocket blanks 1 of the thermoplastic sheet 11. The vacuum of the full-molding step is selected equal to or greater than that of the premolding step. The plugs 39 of the roll plug 32 in a rotating position are inserted into the pocket blanks 1 vacuum sucked into the cavities 34 to full mold the pockets 1. The maximum magnitude of the vacuum sucked in each cavity is insufficient to pull the thermoplastic sheet out of engagement with the plug. As a result, the thermoplastic sheet will conform to the shape of the plug and not to the shape of the cavity.

Then, as shown in FIG. 1, the thermoplastic sheet 11 which has the full-molded pockets 1 is delivered to the content charger 40. The axial half-slitter 41 of the content charger 40 cuts perforations into and axially of the thermoplastic sheet 11. The content feeder of the content charger 40 feeds a content into the pockets 1.

Then, the thermoplastic sheet 11 with the pockets 1 charged with the content is delivered to the sealer 50. The seal feed roller 52 feeds the Al foil constituting the mount 51 to bites between the sealing rollers 55 and 56 and the seal receiving roller 57. The sealing rollers 55 and 56 and the seal receiving roller 57 together heat seal the mount 51 to the thermoplastic sheet 11.

Then, the sealed thermoplastic sheet 11 and mount 51 are together delivered to the trimmer 60. The curl eliminator 61 eliminates a curl of an assembly of the thermoplastic sheet 11 and mount 51. The transverse half-slitter 64 cuts perforations into and transversely of the assembly of the thermoplastic sheet 11 and mount 51. The punching machine 68 punches package units to provide blister packages.

Experiments 1-4

The blister packager and packaging process of Embodiment 1 produced PTP blister moldings with process conditions specified as below. Thermoplastic sheet: Three kinds thereof having different materials and thicknesses were employed.

Material and Thickness (1) High-transparent nonoriented polypropylene sheet (IDEMITSU PURELAY MG-100 (trademark)), 0.2-mm thickness;
(2) PP/PCTFE/PP laminated sheet, 0.32-mm thickness; and
(3) PVDC/PCTFE/PP laminated sheet, 0.32-mm thickness.

Molding drum

Heat insulation layer attached to the side edge surface of each cavity: made of polyamide.
Molding drum temperature: 60 degrees Celsius
Cavity size: third-sized capsule size
Molding speed: 10 m/min

Plug

Material: Teflon coated Al plug
Tapering in top surface of plug: Height of leading edge is 0.5 mm lower than that of trailing edge with reference to line passing past leading edge apex and parallel to tangent passing past tangent point at center between leading and trailing edges.
Plug temperature: 45 degrees Celsius
Clearance between plug and cavity: 0.25 mm

Premolding

Pocket blank was molded at about 2-mm depth of cavity at the center of an axial edge of the cavity.

Full-molding

Interiors of cavities were vacuum sucked for full-molding immediately before plugs are inserted into the cavities.

The transparency of each of the three kinds of thermoplastic sheet used for a blister package in the form of third-sized capsule and produced by the present Experiments was good. The thickness of the top wall of the pocket 1 was no less than 70% thickness of the thermoplastic sheet 1 and a wall thickness distribution in a full-molding was good. Thus, even a thinned thermoplastic sheet provided a good molding. Since even a 10 m/min molding speed provided a good molding, a high-speed molding can be conducted. Since the temperature of the molding drum was 60 degrees Celsius and that of the plug was 45 degrees Celsius so that a low temperature molding of the thermoplastic sheet was conducted, the present blister molding process saved heating energy. In addition, three kinds of thermoplastic sheet 11 with different materials and thicknesses were molded to produce pockets and the wall thickness etc. of a molding made of each thermoplastic sheet 11 entailed no problem, so that the present molding process is applicable to all sorts of thermoplastic sheet 11.

Table 1 shows results of measurements of the top wall thickness of each of the pockets of Experiments 1–4 which were molded under the conditions from the high-transparent nonoriented polypropylene sheet (0.21 -mm thick) as the thermoplastic sheet, and results of ratings of the transparency and mold-reproducibility of the pockets. Table 1 also shows corresponding results of Controlling Examples 1–3. In Table 1, legends o in the column of rating represent goodness and legends x in the column of mold-reproducibility represent that the thermoplastic sheet failed to produce molded pockets. A tension applied to each of the thermoplastic sheets was 1.0 kg/cm.

TABLE 1

| | Sheet | Heat insulation layer | External heating sheet temperature (°C.) | Drum temperature (°C.) | Plug temperature (°C.) | Vacuum (mmHg) (1) | (2) | Rating Top wall (μm) | (3) | (4) |
|---|---|---|---|---|---|---|---|---|---|---|
| Experiments | | | | | | | | | | |
| 1 | PP | Polyimide | 120 | 60 | 45 | 500 | 750 | 160~170 | o | o |
| 2 | PP | Polyimide | 120 | 30 | 45 | 500 | 750 | 150~160 | o | o |
| 3 | PP | Polyimide | 120 | 60 | 80 | 500 | 750 | 150~160 | o | o |
| 4 | PP | Polyimide | 120 | 60 | 130 | 500 | 750 | 140~150 | o | o |
| Controlling Examples | | | | | | | | | | |
| 1 | PP | None | 120 | 60 | 45 | 500 | 750 | — | o | x |
| 2 | PP | Polyimide | 120 | 60 | None | 500 | 750 | — | o | x |
| 3 | PP | Polyimide | 120 | 60 | 45 | — | 750 | 20~25 | o | o |

(1): Premolding
(2): Full-molding
(3): Transparency
(4): Mold-reproducibility

Embodiment 2

A packager used in the present Embodiment 2 comprises essentially the same molded sheet feeder 10, a tensioner 20, a pocket former 30, a content charger 40, a sealer 50 and a trimmer 60 as Embodiment 1. However, the arrangements of the tensioner 20 and pocket former 30 of Embodiment 2 slightly differs from those of the tensioner 20 and pocket former 30 of Embodiment 1.

Figure 6:
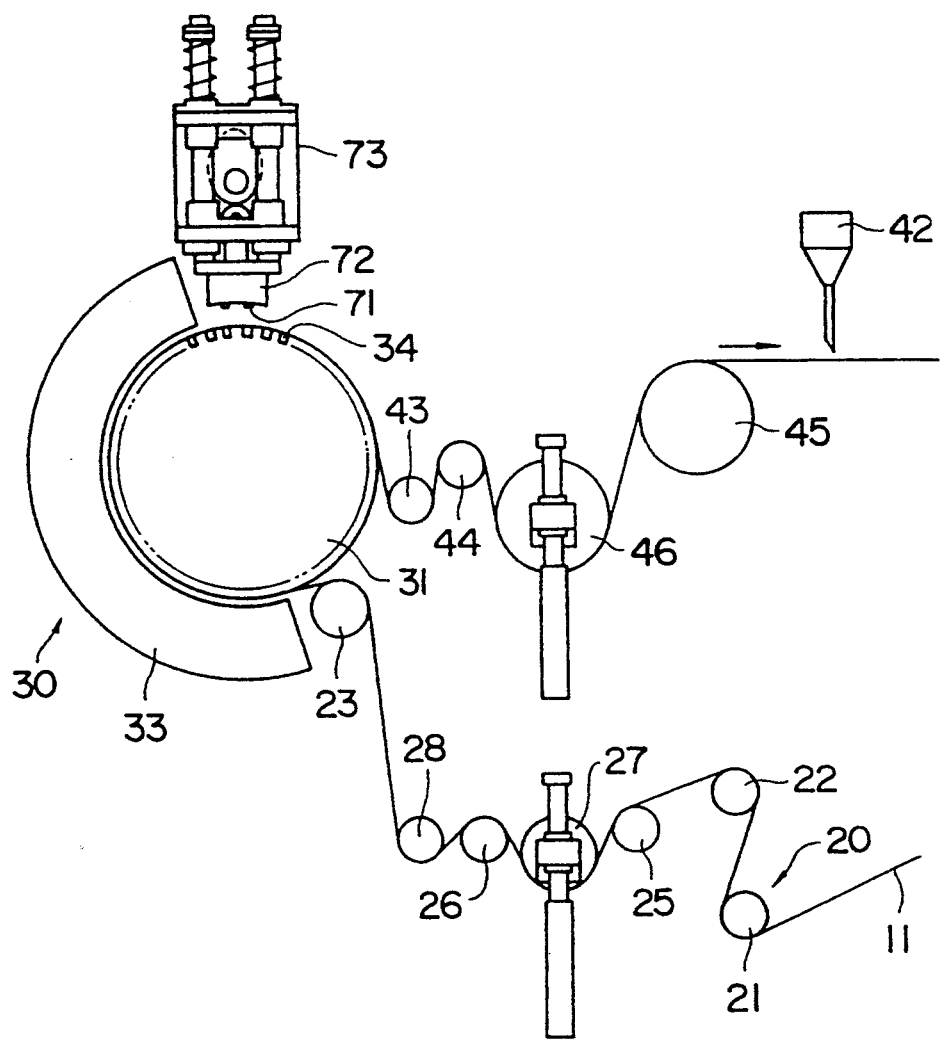
FIG. 6 is a front view of the main part of a blister molding machine used in a second Embodiment of the present invention.

That is, as shown is FIG. 6, the tensioner 20 comprises a first guide roller 21, brake roller 22, dancer roller 27 floated on a part of a thermoplastic sheet 11 running between two rollers 25 and 26, intermediate roller 28, and second guide roller 23. Controlling the weight of the dancer roller 27 applies a predetermined tension to a running part of the thermoplastic sheet 11 intermittently delivered to the pocket former 30. While the molded sheet feeder 10 continuously feeds the thermoplastic sheet 11, the pocket former 30 intermittently receives the thermoplastic sheet 11, which will cause a sag in the thermoplastic sheet 11. However, the dancer roller 27 eliminates the sag so as to stably apply the predetermined tension to the running part of the thermoplastic sheet 11 intermittently delivered to the pocket former 30.

Figure 7:
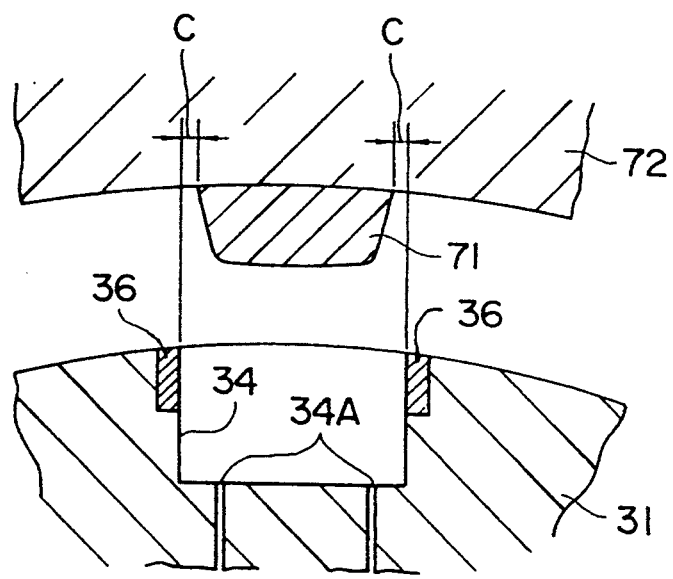
FIG. 7 illustrates fragmentary section of a plug and a portion of a molding drum of the second Embodiment of the present invention.

As shown in FIG. 6, the pocket former 30 comprises an intermittently driven and rotatable molding drum 31, linearly reciprocating plug 71 provided above the molding drum 31, and semicylindrical infrared heater 33 opposite to and near the outer cylindrical surface of the molding drum 31 and movable to and away from the molding drum 31. The plugs 71 are supported on a plug support 72. A drive means 73 comprising a combination of a motor and eccentric cam or a reciprocating hydraulic cylinder moves the plugs 71 to and away from the cavity 34 of the molding drum 31. Each of the plugs 71 comprise a plug body made of Al with the surface coated with an oxide film or Teflon (trademark). The plugs 71 are arranged in the form of two rows spaced in the rotational direction of the molding drum 31. The plug support 72 contains a heater (not shown). As shown in FIG. 7, a clearance C; between the front bottom edge of the linearly reciprocating plug 71 and the leading edge surface of the cavity 34 and a clearance C; between the rear bottom edge of linearly reciprocating plug 71 and the trailing edge surface of the cavity 34 are selected from (the thickness of the thermoplastic sheet 11) to (the total of the thickness of the thermoplastic sheet 11 plus 250 $\mu$m), preferably at (the total of the thickness of the thermoplastic sheet 11 plus 150 $\mu$m), when the linearly reciprocating plug 71 stays at its bottom dead center (FIG. 7 does not show the position of the linearly reciprocating plug 71 staying at its bottom dead center). A clearance C exceeding this total increases an inclination of the side wall of the pocket 1 and thereby the pocket 1 fails to well reproduce the shape of the plug 71. A dancer roller 46 is floated on a part of the thermoplastic sheet 11 running between two rollers 44 and 45 between the molding drum 31 and the content feeder 42 in order to apply a predetermined tension through a guide roller 43 to the part of the thermoplastic sheet 11 running between the two rollers 44 and 45.

A blister packaging process with the blister packager of Embodiment 2 used will be described hereinafter. Embodiment 2 also molds the pockets 1 through essentially the same steps as in Embodiment 1.

That is, as shown in FIG. 1, the thermoplastic sheet 11 is fed by the sheet feed roller 12, delivered to the brake roller 22 and dancer roller 27 of the tensioner 20 and further through the guide rollers 28 and 23 to the molding drum 31 as the molding drum 31 is intermittently driven. The weight of the dancer roller 27 causes a 0.2 kg/cm to 2.4 kg/cm tension in the thermoplastic sheet 11.

Then, as shown in the FIG. 2 illustration of the arrangement of the molding drum 31 and FIG. 6, the thermoplastic sheet 11 is fed to the pocket former 30 of the molding drum 31 in order to be premolded. The infrared heater 33 has heated the molding drum 31 at 30 degrees Celsius to 80 degrees Celsius. The thermoplastic sheet 11 under the tension is vacuum sucked through the suction holes 35 defined in the molding drum 31 to be in close contact with the outer cylindrical surface of the molding drum 31 so that corresponding portions of the thermoplastic sheet 11 in contact with the cavities 34 are vacuum sucked into the cavities 34 through the vacuum communication holes 37. The vacuum of the cavities 34 in the premolding position is preferably no less than 400 mm Hg up to 760 mm Hg. Thus, pocket blanks 1 each with a 50% or less depth of the full-molded pocket 1 are molded.

Then, as shown in FIG. 6, the intermittent rotation of the molding drum 31 delivers the thermoplastic sheet 11 with the pocket blanks 1 to under the linearly reciprocating plugs 71. The plugs 71 descend to the molding drum 31 when the molding drum 31 is in a staying position so as to be inserted into the pocket blanks 1 placed in the cavities 34 to full mold the pockets 1. In the full molding step, the thermoplastic sheet 11 has been vacuum sucked under a 600-mm Hg vacuum or more immediately before the plugs 71 are inserted into the pockets 1. An entering speed of the plugs 71 is preferably selected 5 cm/second or more. When the entering speed is below 5 cm/second, the thickness of the top wall of each full-molded pocket 1 is excessively increased. The stay time of the plugs 71 is preferably 0.2 second or more. A below 0.2 second stay time of the plugs 71 deteriorates the mold-reproducibility of the pockets 1. A heating temperature of the plugs 71 is preferably selected 20 degrees Celsius to 50 degrees Celsius. A below 20 degrees Celsius heating temperature of the plugs 71 excessively increases the thickness of the top wall of each pocket 1 and on the other hand an above 50 degrees Celsius heating temperature thereof unpreferably deteriorates the mold-releasability of each molding.

Then, as in Embodiment 1 of FIG. 1, the thermoplastic sheet 11 with the pockets 1 full-molded is delivered to the content charger 40, sealer 50 and trimmer 60 in this order to produce blister packages of Embodiment 2.

Experiments 5–13

The blister packager and packaging process of Embodiment 2 produced PTP blister moldings with process conditions specified as below:

Thermoplastic sheet: Three kinds thereof having different materials and thicknesses were employed.

Material and Thickness (1) High-transparent nonoriented polypropylene sheet (IDEMITSU PURELAY MG-100 (trademark)), 0.15-mm thickness; and
(2) the same, 0.2-mm thickness.

Molding drum

Heat insulation layer attached to the side edge surface of each cavity: made of polyamide.

Molding drum temperature: 30 degrees Celsius, 70 degrees Celsius

Molding cycle: 100 shots/min

Plug

Material: Oxide film coated plug made of Al
Plug shape: Third-sized capsule shape
Plug temperature: 30 degrees Celsius, 80 degrees Celsius
Clearance C between plug and cavity: 300 $\mu$m, 400 $\mu$m
Plug entering speed: 3.3 m/seconds, 8.6 m/seconds
Stay time at bottom dead center: 0.25 second, 0.14 second Premolding Pocket blank was molded at about 2-mm depth of cavity at a center of an axial edge of the cavity.

Full-molding

Interiors of cavities were vacuum sucked for full-molding immediately before plugs are inserted tightly into the cavities.

The mold-releasability from plug and plug mold-reproducibility of full-molded pockets of each of Experiments 5–13 were rated and the top wall thickness and side wall thickness of molded pocket were measured. Table 2 shows results of the rating and measurements. Table 2 also shows corresponding results of Controlling Example 4. In Table 2, the legends ○, Δ and × in the column of mold-releasability from plug respectively represent that the mold-releasability from plug is good, that a pocket is released from a plug but slightly sticks on the plug and that a full-molded pocket is 10% or more shrunk. A tension applied to each of the thermoplastic sheets was 1.0 kg/cm.

The control of the vacuum of each axial row of cavities 34 is preferable in order to improve the molding performance of the plug former 30.

In accordance with Embodiments 1 and 2, the respective roll plug 32 and plug support 72 contain heaters for heating the plugs 39 and 71. However, the roll plug 32

TABLE 2

| | | | Molding drum | | | | Plug | | | Molding (pocket) | | | |
|---|---|---|---|---|---|---|---|---|---|---|---|---|---|
| | (1) | (2) | Cavity heat insulation layer | Plug clearance C (μm) | Cavity vacuum suction | Material | (3) (°C.) | Entering speed (cm/sec) | (4) (sec) | (5) | (6) | (7) (μm) (8) | (9) |
| | (μm) | (°C.) | | | | | | | | | | | |
| Experiments | | | | | | | | | | | | | |
| 5 | 200 | 30 | Present | 300 | Present | Al, Oxide film | 30 | 8.6 | 0.25 | ○ | ○ | 160 | 80 |
| 6 | 150 | 30 | Present | 300 | Present | Al, Oxide film | 30 | 8.6 | 0.25 | ○ | ○ | 120 | 70 |
| 7 | 150 | 70 | Present | 300 | Present | Al, Oxide film | 30 | 8.6 | 0.25 | ○ | △ | 130 | 80 |
| 8 | 150 | 30 | Present | 400 | Present | Al, Oxide film | 30 | 8.6 | 0.25 | ○ | △ | 120 | 63 |
| 9 | 150 | 30 | Present | 300 | None | Al, Oxide film | 30 | 8.6 | 0.25 | △ | △ | 120 | 70 |
| 10 | 150 | 30 | Present | 300 | Present | Al, Teflon coating | 30 | 8.6 | 0.25 | ○ | △ | 120 | 70 |
| 11 | 150 | 30 | Present | 300 | Present | Al, Oxide film | 80 | 8.6 | 0.25 | △ | △ | 135 | 70 |
| 12 | 150 | 30 | Present | 300 | Present | Al, Oxide film | 30 | 3.3 | 0.25 | ○ | ○ | 140 | 32 |
| 13 | 150 | 30 | Present | 300 | Present | Al, Oxide film | 30 | 8.6 | 0.14 | ○ | △ | 140 | 30 |
| (10) | 150 | 30 | None | 300 | Present | Al, Oxide film | 30 | 8.6 | 0.25 | ○ | X | — | — |

(1): Sheet thickness
(2): Temperature
(3): Temperature
(4): Stay time at bottom dead center
(5): Mold-releasability from plug
(6): Mold-reproducibility
(7): Wall thickness
(8): Top wall thickness
(9): Side wall thickness
(10): Controlling Example As understood from Table 2, Embodiment 2 produced good moldings even when temperatures of the molding drum 31 and plug 71 are 30 degrees Celsius, so that a low-temperature molding of the pockets can be conducted and thereby heating energy can be saved. Since the mold-releasability and mold-reproducibility from plug 71 of the molding are improved by means of adjusting conditions other than the entering speed of plug 71 even when the entering speed of the plug 71 is as high-speed as 8.6 m/seconds, a high-speed molding can be conducted. In particular, since the top wall thickness of the pocket insufficiently increased so that a wall thickness distribution of the molding, even a wall-thinned thermoplastic sheet 11 provides a good molding.

In accordance with Embodiment 1, the tensioner 20 includes a brake roller 22 applying a tension to the thermoplastic sheet 11. Alternatively, the tensioner may include another arrangement. As the present applicant has proposed in Japanese patent application SHO. 63-231578 for example, the tensioner may include an arrangement in which a braking rod brakes a ring fastened to the outer cylindrical surface of a rubber roller.

In addition, the vacuum of each axial row of cavities 34 is adjustable, so that in accordance with Embodiments 1 and 2, the interiors of the cavities 34 into which the plugs 39 and 71 are inserted in the full-molding step are vacuum sucked under a vacuum higher than that of the remaining cavities 34. On the other hand, the vacuum of the cavities 34 into which the plugs 39 and 71 are inserted may equal that of the remaining cavities 34 closed by the thermoplastic sheet 11 as described above, so that a need for a vacuum controller controlling each axial row of cavities 34 is eliminated.

and linearly reciprocating plugs 71 each have an infrared heater provided outside and near them.

In accordance with Embodiments 1 and 2, the heat insulating layer 36 attached to the side edge of the cavity 34 is made of polyamide. However, the heat insulating layer 36 may be made of another material.

The Embodiments 1 and 2 include the blister packaging step. However, the present invention may include only steps up to the step of full-molding a pocket in a thermoplastic sheet.

A process of molding a thermoplastic sheet of the present invention can well thermally mold a pocket in the thermoplastic sheet regardless of the material and structure of the thermoplastic sheet.

The embodiments of the invention in which an exclusive property or privilege is claimed are defined as follows:

1. A process of molding a thermoplastic sheet by plug assist vacuum forming, comprising the steps of:
   a premolding step, which includes:
      bringing a thermoplastic sheet into close contact with the outer cylindrical surface of a molding drum, the molding drum having plural circumferentially spaced cavities therein, each having edge surfaces defined by a heat insulation layer;
      externally heating the thermoplastic sheet and concurrently vacuum sucking the thermoplastic sheet into the cavities of the molding drum to premold a plurality of partially formed pockets in the thermoplastic sheet; and
   a full-molding step, which includes:
      vacuum sucking of the partially formed premolded pockets into the cavities of the molding drum in which they reside and concurrently and sequentially inserting a plug into each pocket to fully form and thermally mold the pocket in conformance with the shape of the plug, the magnitude of vacuum sucking being insufficient to pull the thermoplastic sheet out of engagement with the plug.

2. The process of molding a thermoplastic sheet as recited in claim 1, wherein the thermoplastic sheet is fed under a tension of 0.2 kg/cm to 2.4 kg/cm onto the molding drum.

3. The process of molding a thermoplastic sheet as recited in claim 2, wherein a brake roller or a dancer roller produces the tension.

4. The process of molding a thermoplastic sheet as recited in claim 1, wherein the degree of the vacuum sucked through the cavities during said premolding step is 400 mm Hg and the degree of the vacuum sucked through the cavities during said full-molding step is 600 mm Hg, the degree of the vacuum being defined as a value representing a degree of rarefaction below normal atmospheric pressure.

5. The process of molding a thermoplastic sheet as recited in claim 1, wherein the thermoplastic sheet comprises at least a layer made of polypropylene.

6. The process of molding a thermoplastic sheet as recited in claim 1, wherein the molding drum is at a temperature of 30 degree Celsius to 80 degree Celsius.

7. The process of molding a thermoplastic sheet as recited in claim 1, wherein the molding drum is continuously rotated and wherein the plug is a rotatable roll plug which is inserted into the cavity of the molding drum to thereby fully mold the thermoplastic sheet.

8. The process of molding a thermoplastic sheet as recited in claim 7, wherein a continuous molding speed of the thermoplastic sheet is no more than 10 m/min.

9. The process of molding a thermoplastic sheet as recited in claim 7, wherein the roll plug is at a temperature of 40 degree Celsius to 130 degree Celsius.

10. The process of molding a thermoplastic sheet as recited in claim 7, wherein a radially outward facing top surface of the roll plug is radially inwardly inclined toward the rotational direction of the roll plug.

11. The process of molding a thermoplastic sheet as recited in claim 7, wherein to accommodate a simultaneous rotation of said roll plug and said drum, a clearance is provided between the leading edge of the roll plug and the leading edge surface of the cavity and a further clearance is provided between the trailing edge of the roll plug and the trailing edge surface of the cavity, which clearances are in the range of the total thickness of the thermoplastic sheet to the total of the thickness of the thermoplastic sheet plus 250 $\mu$m, when the roll plug is located as deep as it can go into the cavity.

12. The process of molding a thermoplastic sheet as recited in claim 1, wherein the molding drum is intermittently rotated and a linearly reciprocating plug is inserted into the cavity of the molding drum when the molding drum is stationary to thereby full mold the thermoplastic sheet.

13. The process of molding a thermoplastic sheet as recited in claim 12, wherein the linearly reciprocating plug is at a temperature of 20 degree Celsius to 50 degree Celsius.

14. The process of molding a thermoplastic sheet as recited in claim 12, wherein a cavity-entering speed of the linearly reciprocating plug is no less than 5 cm/sec and a stationary time whereat the plug is as deep as it can go into the cavity during its motion cycle is no less than 0.2 second.

15. The process of molding a thermoplastic sheet as recited in claim 12, wherein to accommodate a simultaneous rotation of said roll plug and said drum, a clearance is provided between the leading edge of the linearly reciprocating plug and the leading edge surface of the cavity and a further clearance is provided between the trailing edge of the linearly reciprocating plug and the trailing edge surface of the cavity, which clearances are in the range of the total thickness of the thermoplastic sheet to the total of the thickness of the thermoplastic sheet plus 250 $\mu$m, when the linearly reciprocating plug is located as deep as it can go into the cavity.

* * * * *